May 13, 1952 — C. R. FAST — 2,596,137
REMOVING DEPOSITS FROM WELLS
Filed Feb. 19, 1949
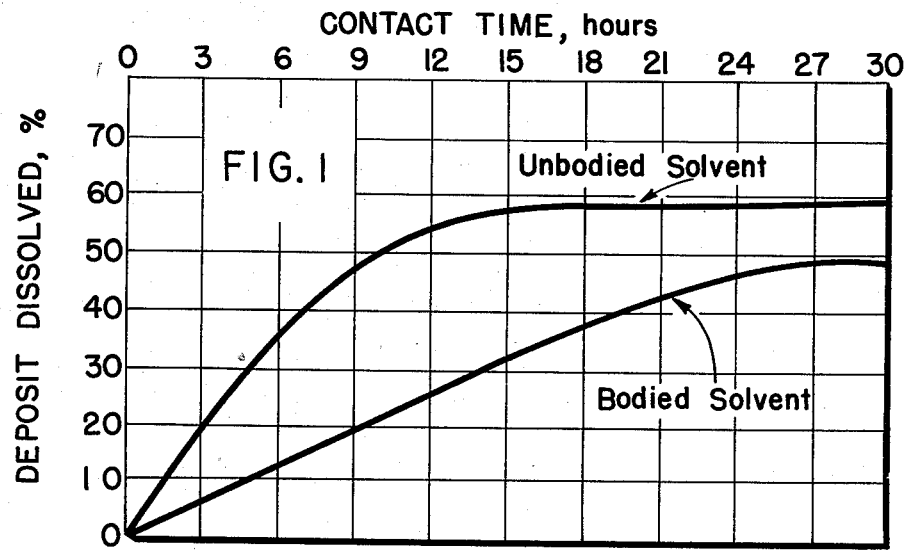
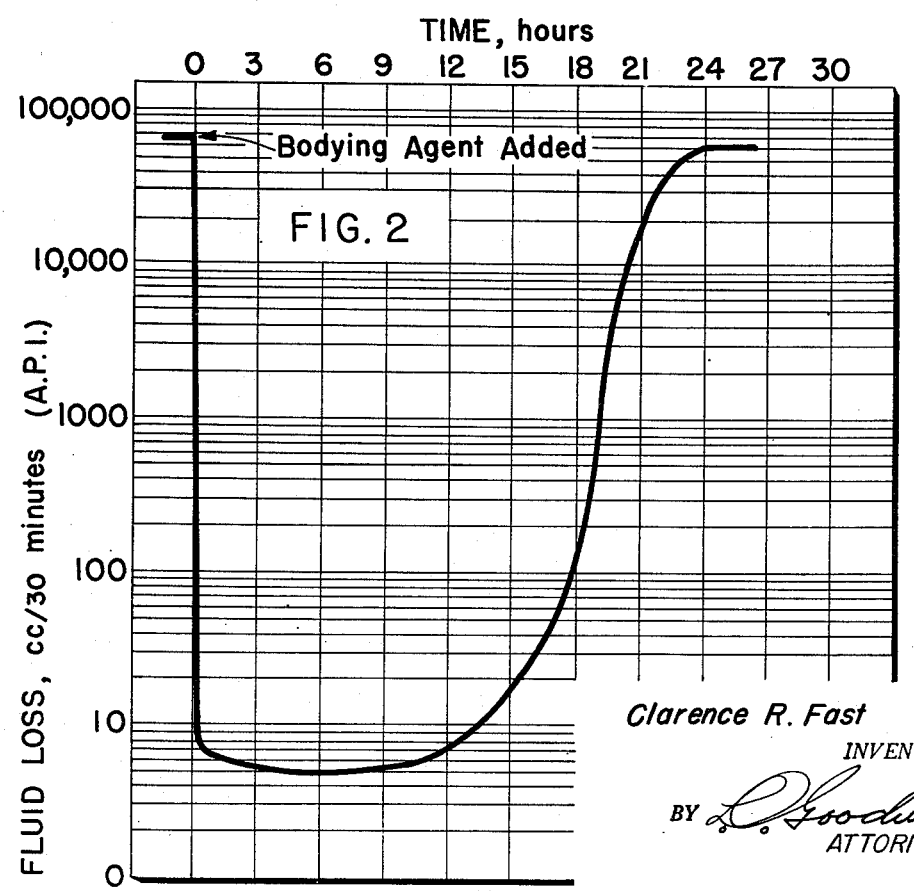
Clarence R. Fast
INVENTOR.
ATTORNEY Patented May 13, 1952

2,596,137

UNITED STATES PATENT OFFICE 2,596,137

REMOVING DEPOSITS FROM WELLS

Clarence R. Fast, Tulsa, Okla., assignor to Stanolind Oil and Gas Company, Tulsa, Okla., a corporation of Delaware Application February 19, 1949, Serial No. 77,426

6 Claims. (Cl. 166—25)

This invention pertains to the treatment of oil and gas wells. More particularly, this invention is concerned with the treatment of oil and gas wells and of producing formations penetrated by such wells to remove deposits from the walls of such wells and from within such formations where the deposit deters production.

Waxy hydrocarbons, wax, gums or the like, hereinafter individually and collectively referred to as "paraffin," are, as is well known in the art, deposited in wells on the faces of producing formations and in the pores and flow channels of such producing formations. The exact cause of this deposition is generally considered to include the accelerated reduction of pressure in the formations causing an evaporation of the lighter hydrocarbons in the crude oil with consequent cooling and supersaturation of the crude oil and accordingly the deposition of paraffin on the well walls and in the pores of the formation. Heretofore it has been proposed to remove these deposits from the well walls and the pores and interstices of these formations by introducing a solvent for the paraffin into the well and then displacing the solvent back into the formation. The use of solvents in this manner has a number of serious disadvantages including particularly the tendency of the solvent to force the microcrystalline or amorphous paraffin back into the pores and thus deter production. This is particularly true where as in the usual case the solvent dissolves the paraffin deposit very slowly and is pumped into the well at a velocity greater than the normal fluid velocity at the time the well is produced. A further disadvantage of this technique is that the solvent, due to the fact that its temperature tends to rise as it enters a formation and to fall as it is produced from the formation, becomes supersaturated with paraffin as it is produced from the formation and thus tends to deposit paraffin in the pores and interstices of the formation adjacent the well.

In water flooding and brine disposal wells various deposits, particularly a gelatinous iron hydroxide deposit, develop on the walls and in the formations adjacent the input well. Calcium and barium sulfate occasionally are precipitated in a well due generally, it is believed, to the mixing of waters, and produce a deposit on the walls of the tubing and the well and within the interstices of the rock adjacent the well. Similarly, well brines occasionally contain calcium bicarbonate, which, apparently, upon decreased pressure, releases carbon dioxide and produces a calcium carbonate deposit on the well walls and in the pores and interstices of the producing formation adjacent the well. These deposits, sometimes referred to as "calcareous deposits," likewise tend to reduce the flow rate both in the well and in the formations.

During the drilling or reconditioning of a well, it is, as is well known, a common practice to use a drilling fluid containing finely-divided solids such as sodium bentonite, starch, or the like. These solids also produce a substantially impermeable deposit on the walls of the well and in the adjacent formation pores, especially where the formations are permeable. This deposit is generally believed to deter production and many rather unsuccessful attempts have been made to remove it.

While the term "deposits," as indicated above, refers in this specification and the appended claims to foreign or unnatural deposits in wells, it also applies to natural or indigenous deposits in wells, such as calcareous formations, calcareous or other soluble films which occur in sedimentary beds and the like in their natural state. Such natural or indigenous deposits like the unnatural deposits deter production, and, as will become apparent from the following description, are particularly subject to treatment according to my invention.

It is therefore an object of this invention to provide improved solvents for well deposits. Another object of the invention is to provide solvents for well deposits, which solvents have the action delayed and the filtrate rate reduced by incorporating therein a bodying agent. It is a further object of this invention to provide an improved method of removing deposits from wells and from the adjacent formations. A still further object of this invention is to provide a method of removing deposits such as paraffin, calcareous precipitates, mud filter cakes, and the like from the walls of the well and from the pores of the formations contiguous to a well by introducing into the well a bodied solvent whereby the solvent is maintained in contact with the deposit for a substantial length of time. These and other objects and advantages of this invention will become apparent as the description proceeds. In this description reference will be made to the accompanying drawings in which:

Figure 1 is a graphical representation of the reaction rate of my improved solvents together with the reaction rate of typical solvents for comparison, and Figure 2 is a graphical representation of the fluid loss vs. time of my improved solvents.

I have found that, in general, the removal of any deposit from a well (which includes, in the following description and appended claims, the formations adjacent the well), requires an extended contact time between the solvent and the deposit. Furthermore, I have found that with the known solvents it is practically impossible, and certainly uneconomical, to maintain contact between the solvent and the deposit for a sufficient time to dissolve a substantial part of any deposit. In this connection I have also found that the ordinary solvents invariably are lost into the most permeable formations penetrated by a well before they have had adequate contact time with the deposit. Therefore, unless the solvent is continuously injected into a well, only insignificant amounts of the deposit can be removed with such solvents. In my present invention, a solvent for the deposit in the well is "bodied," i. e., the viscosity is increased and the filtrate rate or fluid loss is decreased substantially, preferably at least 10 to 100 times or more compared with the unbodied solvent, whereby the tendency of the solvent to filter into the permeable formations penetrated by the well is materially retarded.

A "solvent," as the term is used in this specification and the appended claims, refers to any material which is capable of at least partially dissolving a well deposit where "dissolving" includes dispersion, solution, suspension and the like. Examples of such solvents are: acids, such as hydrochloric, hydrofluoric, sulfuric, chlorosulfonic, and other strong mineral acids or combinations thereof; gasoline, preferably debutanized, mixtures of alcohol and debutanized gasoline, petroleum naphtha, carbon tetrachloride, tetrachloroethylene, carbon disulfide, aromatic hydrocarbons and the like.

A "bodying agent," as the term is used in this specification and the appended claims, refers to any agent which tends to reduce substantially the filtrate rate of a liquid solvent as by thickening or gelling the solvent. Examples of bodying agents are, in the case of the acid solvents, gum karaya and similar water-soluble gums capable of increasing the viscosity of the acid solution. I have found that from about 0.5% to about 10% by weight of the gum relative to the solvent, preferably between about 1 and about 5% gum, produces a suitable filtrate rate or fluid loss for use in dissolving deposits with my bodied acids. Specifically, I have found that, for example, in a 15% water solution of hydrochloric acid having a viscosity of about 1 to 2 centipoises, 3% of gum karaya based upon the weight of the hydrochloric acid solution when dispersed in the acid solution produces a solvent having a viscosity, within 5 minutes after mixing, of about 200 centipoises and a fluid loss of between about 5 and about 10 cubic centimeters per 30 minutes in the filtration equipment described in API Code No. 29, Second Edition, July 1942 (tentative).

The filtrate rate or fluid loss of the bodied solvent which is introduced into the well according to this invention, particularly in the hereinafter described embodiment wherein the solvent is forced into and fractures the formations, is preferably, at least over a short time interval, within the range of what is considered a low filtrate rate drilling fluid. For example, at the time the formation breakdown pressure is applied, the filtrate rate of a suitable solvent, should be within the range of between about 1 and about 100 cc., preferably between about 5 and about 25 cc., in 30 minutes, using the filtration equipment described in API Code No. 29, Second Edition, July 1942 (tentative). Generally, however, a substantially higher fluid loss can be tolerated when the pressure differential between the solvent and the formation fluids is small.

In operation the solvent may be weighed or otherwise measured and the bodying agent in the proper proportion is added in a tank as the liquid solvent is stirred. Sometimes the solvent may to some advantage be heated during the addition of the bodying agent and thereafter. Alternatively, a flow-type mixer for the bodying agent and the solvent may be used at the well head, particularly where the solvent and bodying agent react rapidly and will not filter through the formations at the bottom of the well after the normal time is provided for displacing the solvent to the desired formation in the well. As indicated in Figure 1, a representative unbodied solvent at normal well temperatures requires several hours contact with a deposit before the solvent and deposit are in equilibrium. The time for various solvents and various deposits to reach equilibrium, of course, varies over a rather wide range, but, in general, as indicated by Figure 1, there must be contact for at least several hours and preferably for at least a day.

Therefore, after the bodying agent has been added to the solvent and after the gellation and fluid loss of the solvent have proceeded to a suitable point, as described above, the bodied solvent is introduced into the well, and allowed to remain in contact with the deposit, preferably with the well shut in, for from a few hours to a day or more. In some cases, after the gelled solvent has been placed opposite the formations containing a deposit, a substantial pressure is applied to the bodied solvent or gel either directly or indirectly by, for example, pumping another fluid into the well on top of the gel, thereby building up a hydrostatic pressure at the level of the contaminated formation great enough to cause the formation to part or fracture and to cause the bodied solvent to enter and extend the fracture into the formation. The pressure required at the surface to part or fracture a formation hereinafter referred to as the "formation breakdown pressure" is roughly equivalent in pounds per square inch to the depth in feet of the formation fractured. This pressure varies, however, from place to place depending upon the depth, the nature of the formations, folding of the formations, and the like. This formation breakdown pressure is perhaps better defined by the characteristic drop in pressure when the bodied solvent is being pumped into the well. More particularly, I have found that as the bodied solvent is pumped into the well and displaces the well fluids back into the formation, the pressure tends to rise rather abruptly when all of the well fluids have been displaced back into the formations and the bodied solvent fills the well. By continuing the injection of gel or a superimposed fluid into the well, the pressure eventually breaks or decreases abruptly indicating that whereas the bodied solvent which has a low filtrate rate is prevented from entering the pores, the formation breakdown pressure has been built up and the selected formation is fractured. When the contaminated formation, which may be isolated with packers from the other formations exposed in the well, is fractured, the bodied solvent is displaced through the fractured back into the formations around the well. While the fracture may extend either in a vertical or horizontal plane back into the formations with substantially equal effect, it is believed that in ordinary stratified formations the bodied solvent is displaced in a fracture generally radially along a bedding plane in a sheet back into the formations around the well. Since the solvent containing the bodying agent has a low filtrate rate, it can be displaced a substantial distance into the formation, extending the fracture therein and generally increasing the thickness of the fracture adjacent the well.

The action of this bodied solvent, as indicated also by Figure 1, is substantially retarded with respect to unbodied solvent. Aside from the fact that the bodied solvent is displaced into the fracture en masse rather than being filtered through the pores of the formation, this retardation permits the solvent to be displaced into the formation with substantially less dissolved deposit and less reaction during the injection period than when unbodied solvent is pumped into a formation. Thus, there is much less tendency with my improved solvent to carry the deposit initially in or adjacent the well back into and further contaminate the formation and the solvent is also less spent on reaching its final location.

The amount of solvent required to remove a deposit from a well varies from place to place, depending upon a number of variables including, particularly, the solubility and extent of the deposit. I generally prefer that sufficient solvent be injected into the well to fill completely the theoretical volume of the hole. In some instances, however, from 500 to 1,000 gallons or more of bodied solvent are injected into a well, in addition to the theoretical volume of the well.

When sufficient bodied solvent has been injected into the well, preferably at a rapid rate, the well is shut in and the bodied solvent is allowed to remain in quiescent contact with the deposit for from a few hours to several days. The deposit appears to go directly into solution in the bodied solvent. The maximum efficiency of solution in bodied solvent, as indicated in Figure 1, appears to be less, generally, than the efficiency of unbodied solvent. In practice, however, the maximum efficiency of unbodied solvent cannot be attained because, as described above, the proper length of contact between solvent and deposit cannot be obtained in a well. In the bodied solvent, conversely, the contact time can be arranged at will so that even in a well the solvent will dissolve substantially the same amount of deposit that it would on the surface under ideal conditions. Therefore in practice the efficiency of the solvent is actually much higher when the solvent contains a suitable bodying agent.

After the well has been shut in for some time, or after the bodied solvent has otherwise been in contact with the deposit for a sufficient time substantially to reach equilibrium, the solvent may be followed either directly or indirectly by a peptizer or gel breaker which, as used herein, is a fluid which tends to reduce the viscosity of the solvent to substantially its original value prior to the incorporation of the bodying agent.

In some cases, particularly in the case of the acidic solvents, the bodying agent appears to be hydrolyzed eventually by the acid and the viscosity automatically breaks. The fluid loss or filtrate rate of a typical bodied acid in a well having a temperature between about 85 and 100° F. is shown in Figure 2. It will be noted that the fluid loss dropped rapidly after the bodying agent was added. In fact, I have found in practice that in the average well if the bodying agent is added to the solvent with a jet mixer and pumped immediately into the well, the fluid loss of the solvent by the time it reaches the open hole or perforations at the bottom of the well will be sufficiently low to prevent appreciable loss of the solvent to the surrounding formations. The fluid loss then remains low for from a few hours to a day or more, depending upon the temperature, the concentration of the acid and the bodying agent, etc. In general, the more concentrated the acid, the sooner the viscosity breaks, and where a rapid break is desired a gel breaker such as a concentrated acid solution may be injected into the well to break the gel and raise the filtrate rate.

In due time the solvent with the entrained or dissolved deposit is pumped or otherwise artificially or naturally produced from the well with the oil or water.

It will thus be apparent that I have provided a composition and method of introducing this composition into a well so that paraffin and other deposits such as calcium or sodium salts or inert filter cakes deposited in the pores of a formation or on the walls of a well may be removed from a well, either producing or input, and so that these deposits will not be carried by the solvent further into the formation to block fluid flow therefrom to the well. Other modes of applying the composition and principles of my invention will be apparent to those skilled in the art without departing from the spirit thereof. For example, it is desirable in some cases to incorporate in the bodied solvent a propping agent such as sand which will be carried with the bodied solvent into the formation fracture and deposited there when the viscosity of the bodied solvent is later broken and removed from the formation. This propping agent then tends to support the upper formations or otherwise hold the fracture open and increase the formation permeability into the well. It is also desirable in some cases to apply 2 or more similar treatments to a well in series. The invention should, therefore, be construed to be limited only by the appended claims.

I claim:

1. A method of acidizing a formation penetrated by a well comprising introducing into said well a mineral acid and a quantity of a water-soluble gum as a bodying agent for said acid, said bodying agent being in sufficient proportion to form a gel capable of breaking on prolonged standing and having a filtrate rate of less than about 100 cc. in 30 minutes using the filtration equipment and procedure described in A. P. I. Code No. 29, Second Edition, July, 1942 (Tentative), poisitioning said gel in a confined zone adjacent said formation, increasing the pressure of said gel until a formation fracture is indicated by a decrease in resistance to flow of said gel, continuing application of high pressure to force a portion of said gel into said fracture, maintaining said gel in contact with said formation for a substantial time and thereafter producing said well.

2. A method according to claim 1 in which said gel is positioned in said confined zone during gelation of the gel.

3. A method according to claim 1 in which said gum is karaya.

4. A method according to claim 1 in which a quantity of unbodied concentrated acid solution is injected into the well following said gel to accelerate the breakdown of said gel.

5. A method of treating a well to remove a calcareous deposit therefrom comprising introducing into a formation penetrated by said well under a pressure as great as the formation breakdown pressure a quantity of mineral acid solution containing a quantity of gum karaya, leaving said acid in contact with said calcareous deposit for a substantial time and thereafter producing said well to remove said deposit therefrom.

6. A method of treating a well to remove a calcareous deposit therefrom comprising introducing into a formation penetrated by said well under a pressure as great as the formation breakdown pressure a quantity of bodied mineral acid solution containing a quantity of gum karaya, subsequently introducing into said formation a quantity of unbodied concentrated acid solution, leaving said acid solutions in contact with said calcareous deposit for a substantial time, and thereafter producing said well to remove said deposit therefrom, whereby said acid solution enters the formations penetrated by said well en masse and dissolves said deposit without forcing said deposit back into the pores of said formations, and whereby the viscosity of said acid solution produced by said gum karaya is substantially reduced, and the spent acid containing said deposit may be removed from said formations when said well is produced.

CLARENCE R. FAST.

REFERENCES CITED

The following references are of record in the file of this patent:

UNITED STATES PATENTS

| Number | Name | Date |
| --- | --- | --- |
| 657,951 | Mooney | Sept. 18, 1900 |
| 1,484,444 | Wilson | Feb. 19, 1924 |
| 1,989,479 | Grebe | Jan. 29, 1935 |
| 2,122,483 | Menaul | July 5, 1938 |
| 2,127,662 | Grebe | Aug. 23, 1938 |
| 2,128,160 | Morgan | Aug. 23, 1938 |
| 2,233,271 | Staudt | Feb. 25, 1941 |
| 2,354,570 | Benckenstein | July 25, 1944 |
| 2,379,516 | Garrison | July 3, 1945 |
| 2,492,173 | Mysels | Dec. 27, 1949 |

FOREIGN PATENTS

| Number | Country | Date |
| --- | --- | --- |
| 532,816 | Great Britain | Jan. 31, 1941 |

OTHER REFERENCES

Fitzgerald, P. E., "Oil and Gas Journal," page 46, Feb. 4, 1937.